United States Patent [19]

Cleary et al.

[11] Patent Number: 4,769,652
[45] Date of Patent: * Sep. 6, 1988

[54] METHOD AND APPARATUS FOR HANDLING SHEET MATERIALS

[75] Inventors: Arthur Cleary, Derry; Calvin Winey, Tewksbury, both of Mass.

[73] Assignee: Advanced Color Technology, Inc., Cambridge, Mass.

[*] Notice: The portion of the term of this patent subsequent to Nov. 17, 2004 has been disclaimed.

[21] Appl. No.: 861,594

[22] Filed: May 9, 1986

[51] Int. Cl.$^4$ .............................. G01D 15/28
[52] U.S. Cl. .................. 346/136; 242/67.3 R; 346/138; 346/24
[58] Field of Search ............ 346/1.1, 24, 136, 137, 346/138, 140; 355/3 DR, 16; 358/304; 242/67.3

[56] References Cited

U.S. PATENT DOCUMENTS

| | | | |
|---|---|---|---|
| 3,829,208 | 8/1974 | van Meijel et al. | 355/16 X |
| 3,974,974 | 8/1976 | Nishikawa | 355/16 X |
| 4,005,257 | 1/1977 | Krallinger et al. | 358/304 X |
| 4,703,329 | 10/1987 | Allen | 346/136 X |
| 4,707,704 | 11/1987 | Allen | 346/136 X |
| 4,707,712 | 11/1987 | Buckley | 346/136 |

*Primary Examiner*—Joseph W. Hartary
*Attorney, Agent, or Firm*—E T Barrett

[57] ABSTRACT

An ink jet printer with a continuous supply of sheet material from a spool contained within an imaging drum. The sheet material is withdrawn from the interior of the drum by a pair of rollers carried by the drum and removably connected to an external drive system. The sheet material travels around the drum and is held by the rollers in that position. The external drive system is then disconnected allowing the drum to rotate while a printing head scans the surface of the sheet material to produce the desired image. After the imaging process, the drum is stopped in a predetermined position and the rollers connected to the external drive. The rollers are then driven to eject the imaged sheet material while a fresh supply is withdrawn from the interior of the drum and wrapped around its outer surface. The ejected sheet material is sheared by a transverse cutter and the sheared end of the sheet material is withdrawn by the rollers to a length short enough that it does not interfere with the subsequent imaging step. Means are provided for tensioning the sheet material around the drum prior to the next imaging process. The operation of the drive mechanism in three modes, a rest mode while the drum rotates, a paper ejecting mode, and a paper tensioning mode, is controlled by the lateral position of the cutter mechanism.

6 Claims, 9 Drawing Sheets

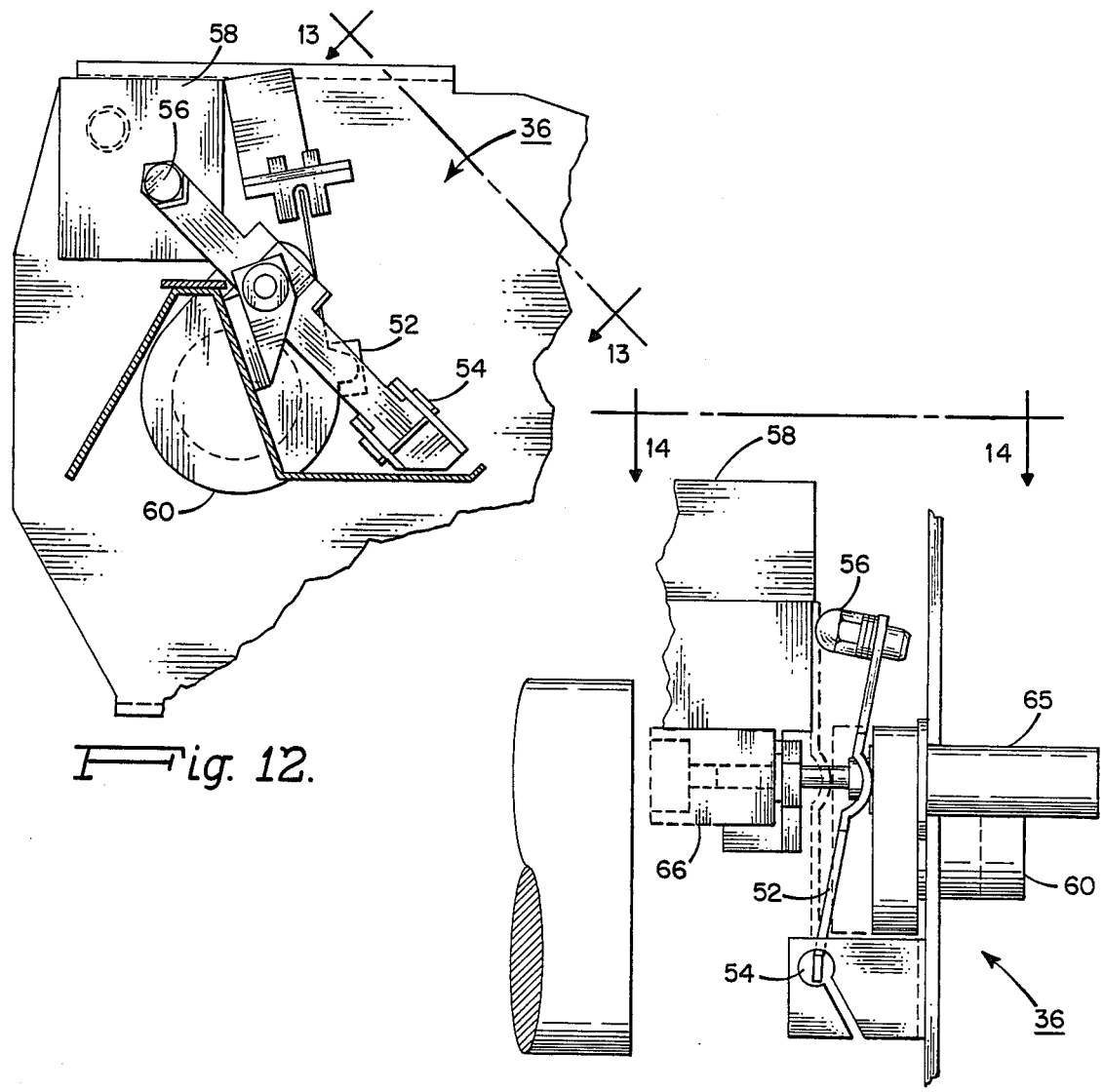
Fig. 12.
Fig. 13.
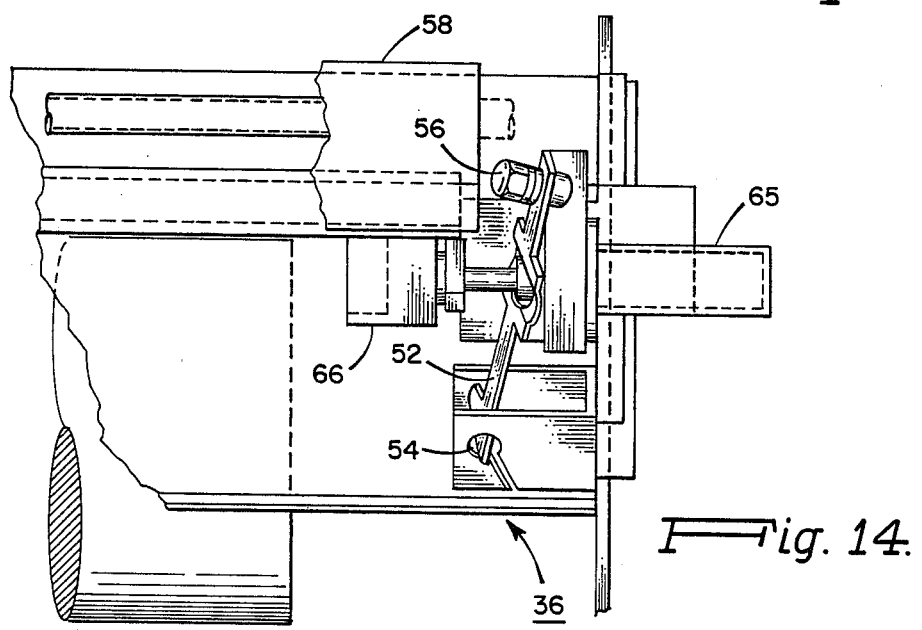
Fig. 14.

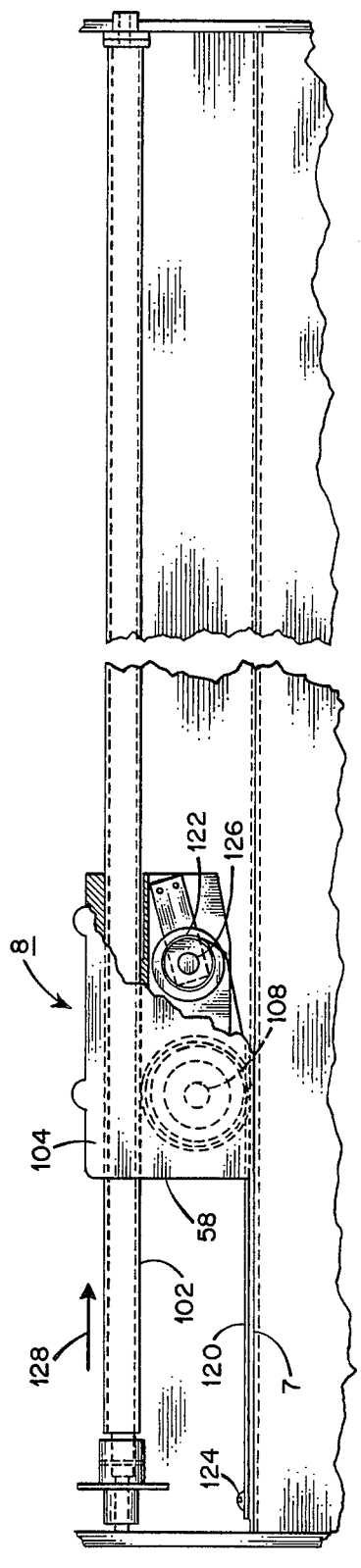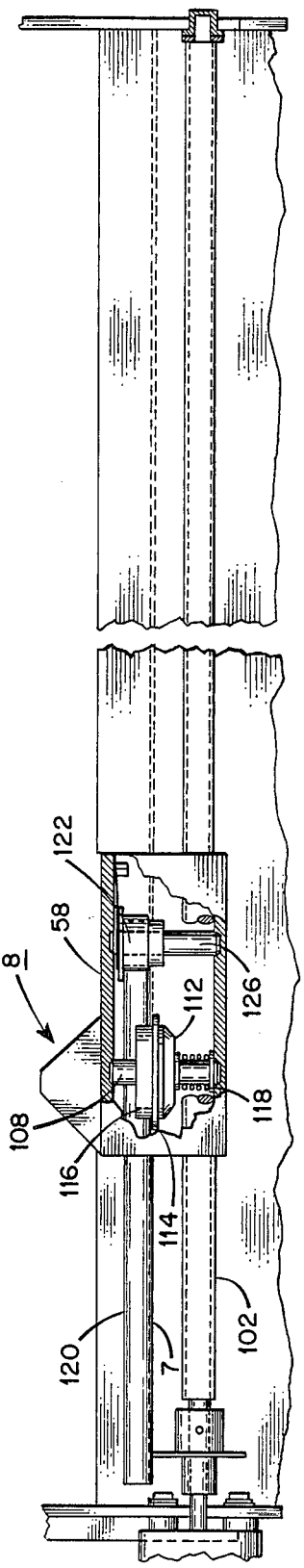

METHOD AND APPARATUS FOR HANDLING SHEET MATERIALS

BACKGROUND OF THE INVENTION

1. Field of the Invention

This invention relates to paper supply mechanisms of the type used with ink jet printers, facsimile machines, copiers and the like. More particularly it relates to a roll feed mechanism in which a supply of paper, or other sheet material, is stored within an imaging drum and is arranged to feed to the outer surface of the drum where writing or imaging operations occur.

2. Brief Description of the Prior Art

Countless arrangements have been used to supply paper and other sheet materials automatically to many different types of reproducing machines. In some of these, cut sheets are fed individually from a supply stack, but it is difficult to feed the sheets onto and from the imaging drum, and complex mechanisms are usually required to perform these operations. In other feed systems, paper is fed from a continuous roll into the reproducing equipment and is cut into individual sheets either before or after the imaging operation. In some instances, the continuous supply of paper is cut into individual sheets of the desired length before being fed onto the drum in an effort to overcome the problems associated with feeding a continuous supply onto the drum.

Various machines have been provided for storing a supply of web materials in a roll within a drum, withdrawing the material around the outside of the drum, where it is utilized for imaging or other purpose, and returning the web to a disposal roll within the drum. Such a machine is described for typewriter ribbon in U.S. Pat. No. 866,624 to Collier. Photocopier machines have used similar mechanisms to supply incremental replacement portions to the outside of a photocopier drum and then return the used material to a storage roll within the drum. Examples of such machines are shown in U.S. Pat. Nos.: 4,097,138 to Kingsley; 4,102,570 to Shimoda; 4,231,652 to Moser and Wegmann; and 4,239,375 to Eisbein and Wegmann. All of such machines are designed for relatively slow rotation of the imaging drum and for use in applications where web materials are used at a relatively slow rate. Because of the gradual and continual shifting of the center of gravity as the web is fed from the supply to the disposal roll, it is not possible to dynamically balance the drum for higher speed operation.

U.S. Pat. No. 3,829,208 to van Meljel discloses a copy machine in which a a supply of sensitized web material is stored on the axis of and within the drum and withdrawn around the outer surface of the drum. The web is utilized during the rotation of the drum to produce photocopies and when it is to be replaced by a fresh supply of web, the fresh web is drawn from within the drum and wrapped around the exterior while the used web is discarded away from the drum. The driving force for the web is provided by two pairs of rollers; a first pair carried by the drum, which engage the web only after it has passed around the exterior drum surface, and a second pair of rollers which are spaced from the drum and mounted in a fixed position relative to the rotation of the drum. Tensioning of the web is provided by a roller mounted within the drum which is spring biased against the web in the space between the supply roll and the exit slot in the drum. The forces introduced by the resistance to rotation of the supply roll and the friction of the web on the drum surface are exerted on the drive rollers which are engaged only after the web has passed around the drum. Such an arrangement has particular difficulties where it is important to store larger quantities of sheet material within the drum and when using sheet material, such as paper, that may have higher friction with the drum surface, or which is subject to distortion by stretching when excess tension is applied. The machine is intended only for use with web materials that are to be discarded.

SUMMARY OF THE INVENTION

A roll of paper, or other sheet material, is stored on a supply spool mounted within an imaging drum. The paper feeds from the supply spool through a longitudinal opening in the drum to the outside, passes around the drum, where it is held in place during the imaging process, and then ejected from the drum to the desired length and cut off. While the imaged sheet is being ejected from the drum, the next length of paper is drawn from the interior of the drum and around the outside of the drum in position for the next imaging operation. The length of paper that remains projecting from the drum after the imaged paper has been cut off is then withdrawn into the interior of the drum through the longitudinal opening in the drum surface until only a short stub, which will not interfere with the subsequent imaging operation, remains protruding from the drum. The entire operation is automatic under the control of a central processor unit.

The assembly includes drive rollers carried by the drum which are connected automatically to a drive mechanism when the drum is stopped in a predetermined position. The drive rollers operate to withdraw the sheet material from the supply roll, prior to the material passing around the drum surface, and again after the material has passed over the drum surface. These same rollers are utilized to withdraw the severed end of the sheet material into the drum and to tension the material around the drum. All rollers controlling the movement of the sheet material are mounted on and carried with the drum.

The supply mechanism has particular advantages for ink jet printers, but it can be applied to different devices requiring the handling of continuous lengths of sheet materials that are later to be cut into individual sheets.

BRIEF DESCRIPTION OF THE DRAWING

FIG. 12 is an end view along line 12—12 of FIG. 10;
FIG. 13 is a view along line 13—13 of FIG. 12;
FIG. 14 is a top view of the assembly along line 14—14 of FIG. 13;
FIG. 16 is a front view, partially cut away, of the mechansim for shearing the paper after each imaging operation;
FIG. 17 is a top view, partially cut away, of the cutting mechanism of FIG. 16.

DESCRIPTION OF THE PREFERRED EMBODIMENT

Figure 1:
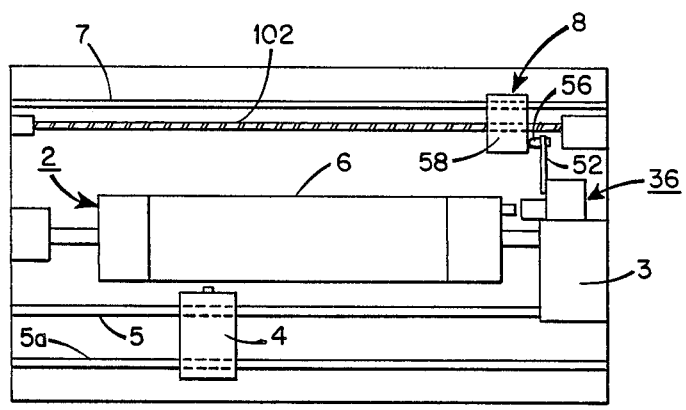
FIG. 1 is a diagrammatic top view of an ink jet printer embodying the invention.

As shown in FIG. 1, the ink jet printer includes a rotatable drum, generally indicated at 2, that is driven by a stepping motor 3. An ink jet printing head assembly 4 is mounted for longitudinal movement along tracks 5 and 5a. The imaging paper or other sheet material 6 envelopes the outer surface of the drum 2 during the imaging process and, at its conclusion, is ejected across a cutter bar 7 where it is sheared by a cutter mechanism, generally indicated at 8. The term "sheet material" as used in this application includes the various flexible media on which images can be recorded, such as paper, transparencies and photographic materials, which are supplied in long lengths. While the drum 2 rotates, the print head 4 moves longitudinally along the drum 2 tracing a spiral path on the paper 6 to produce the desired image. As the completed image is ejected, a length of unused paper is simultaneously drawn from the interior of the drum 2 and positioned around the outside of the drum.

The Paper Drive Mechanism

Figure 2:
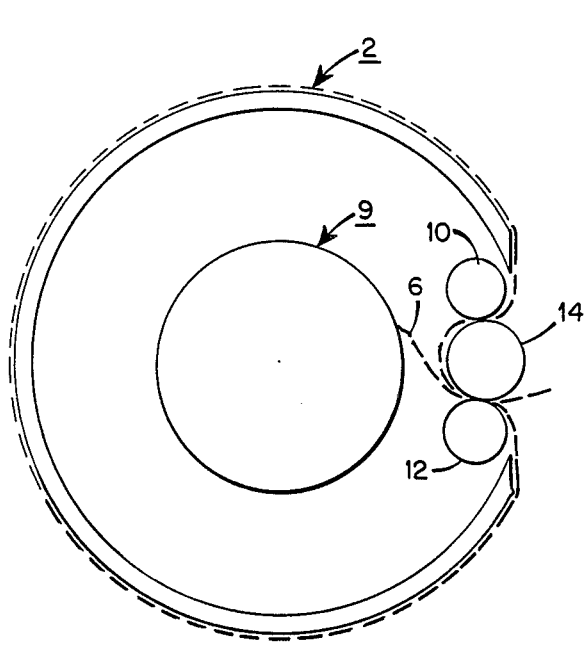
FIG. 2 is a diagrammatic illustration of the paper drive rollers.
Figure 3:
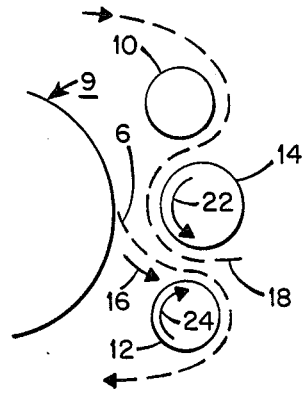
FIGS. 3 and 4 are diagrammatic views with the paper drive rollers separated for purposes of explanation.
Figure 4:
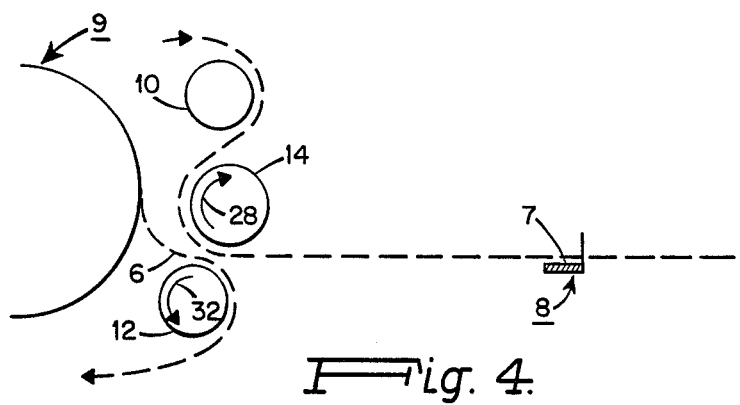

As illustrated diagrammatically in FIGS. 2, 3 and 4, the rotatable drum 2 supports within it a rotatably mounted spool, generally indicated at 9, that carries a roll of paper 6. The drum 2 also carries three rollers: an idler roller 10, a tension roller 12, and a drive roller 14. The path of the paper around and between these rollers is illustrated in FIGS. 3 and 4 where the rollers 10, 12 and 14 have been spaced apart only for the purpose of illustration. Although the idler roller 10 forms part of this preferred embodiment, and has numerous advantages as will be noted later, it is not an essential element for the paper transfer functions.

The paper 6 from the spool 9 passes between the drive roller 14 and the tension roller 12, as illustrated by the arrow 16, partially around roller 12 and then around the outer circumference of the drum 2. After passing around the surface of the drum 2, the paper passes between the idler roller 10 and the drive roller 14, partially around the inner surface of the roller 14 and then between the rollers 12 and 14 where one surface of the paper engages the roller 14 and the other surface engages the length of paper already between the same pair of rollers. A short stub 18 (FIG. 3) of paper extends from between the rollers 12 and 14.

Figure 5:
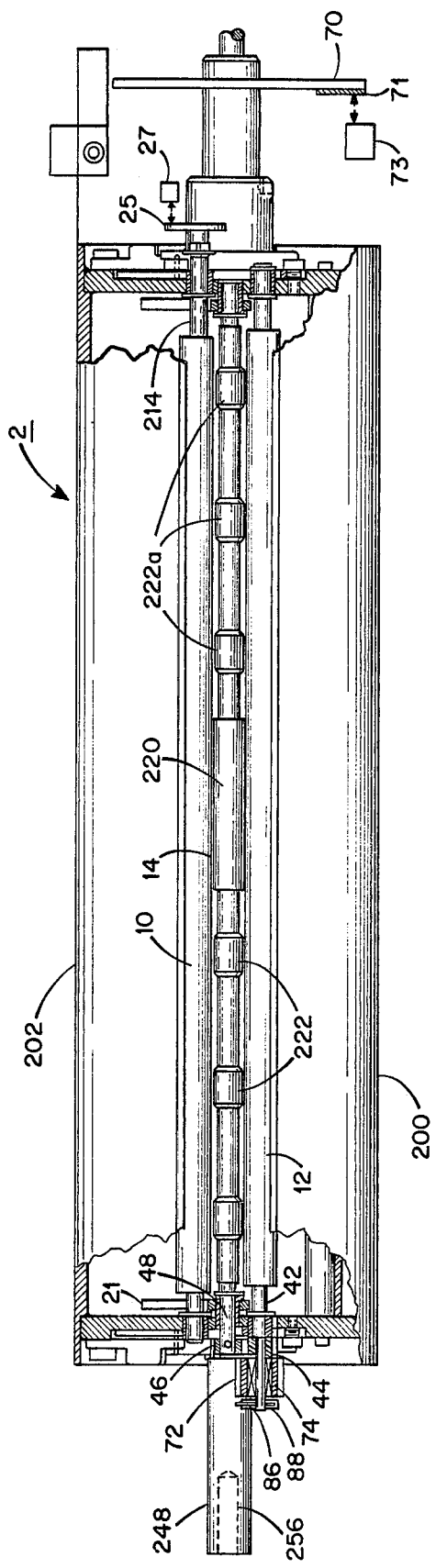
FIG. 5 is an elevational view of the imaging drum, partially cut away to show the interior construction.

In that condition, the paper 6 is tensioned around the drum 2 and the rollers 12 and 14 are locked in position. The imaging process is then performed to produce an image on the surface of the paper 6 on the drum. When the imaging is completed, the drum is stopped at a predetermined rotary position and a drive mechanism, to be described later, is connected to the roller 12. To eject the imaged paper, the rollers 12 and 14 are driven in the directions indicated by the arrows 22 and 24 in FIG. 3. This action causes additional paper to be drawn from the spool 9 and travel around the drum while the rollers 12 and 14 eject the imaged paper. When a sufficient length of paper has been ejected, the paper extends to the cutter mechanism 8 in FIG. 4, which may be located some distance from the drum 2. The length of the paper ejected may be measured by any appropriate mechanism such as by the rotation of a disk 25 (FIG. 5) that is secured to and rotates with the idler roller 10. The disk 25 has radial non-reflecting stripes that are detected and counted by an infrared detector 27. The paper is then sheared by the cutter mechanism 8 to separate the imaged portion. At this time, a length of paper extends from the drum 2 to the cutter bar 7. The drive mechanism is arranged to drive the rollers 12 and 14 in the directions indicated by the arrows 28 and 32 in FIG. 4. This action draws the paper back between the rollers 12 and 14, partially around the surface of roller 14, between roller 14 and the idler roller 10, around the outer surface of the drum 2, and again between the rollers 12 and 14 into the interior of the drum. This motion is continued until the paper is withdrawn to again leave the short stub 18 projecting from between rollers 12 and 14 as measured by reverse rotation of the disk 25.

During the imaging process, it is important that the paper 6 be in close contact with the surface of the drum 2. This is achieved by locking the roller 14 and driving the roller 12 in the direction indicated by the arrow 32 in FIG. 4. The driving surfaces of the rollers 12 and 14, which may be rubber, have relatively high friction so that when the roller 12 is driven in the reverse direction indicated by arrow 32, it tensions the paper around the drum by returning a short length of paper into the drum while the paper at the other end of the drum surface is restrained because of the surface friction of the locked drive roller 14. During this motion, the stub 18 is prevented from being withdrawn into the drum because the friction between the surface of the roller 14, which is locked, and the paper is substantially greater than the friction between the two adjacent surfaces of the paper. During and subsequent to this tensioning process, the roller 12 is driven through a one-way clutch, to be described later, which permits rotation of the roller 12 only in the direction of the arrow 32 relative to the gear that drives this roller. Thus, when the tensioning action is complete and the drive is released from the roller 12, the paper remains under tension. The tensioning process is not controlled by the length of the paper withdrawn, but instead the tensioning roller 12 is merely allowed to operate for some prefixed period of time, for example, five seconds. Alternatively, a tension responsive switch can be used to disconnect the drive.

When the tensioning process has been completed, the drive mechanism is disconnected from the drum which is then rotated to produce the next imaging sequence. This arrangement permits an automatic continuing sequence of imaging processes while eliminating many of the problems of handling the paper and at the same time reducing the cost and simplifying the paper-handling equipment.

FIGS. 5, and 9-15 illustrate a drive assembly, generally indicated at 36, (FIG. 10) for the rollers 12 and 14. The position of this drive assembly controls the three operating modes: the rest mode during which the drum 2 is free to rotate; the drive mode for ejecting and retracting the paper 6; and the tensioning mode when the paper is tensioned around the drum 2.

During the rest mode, the drive assembly 36 is disconnected from the roller 12 by moving the drive assembly to its position farthest removed from the drum 2 leaving the drum free for rotation. This is illustrated by the diagrammatic representation of FIG. 9 in which the coupling is viewed from the front of the printer. In the driving mode, the drive assembly is moved to its position nearest the drum 2 and is arranged to drive rollers 12 and 14, mounted on shafts 42 and 48 respectively, (FIG. 5) by means of a spur gear 44, carried by the shaft 42, and a similar gear 46 carried by the shaft 48 of the drive roller 14.

In the tensioning mode, the drive assembly 36 is positioned at an intermediate station where it is arranged to drive the roller 12 while the roller 14 is locked against reverse rotation by the drive assembly.

When the drum 2 is rotating, as during the imaging mode, the roller 12 is disconnected from the drive assembly 36 by a lever 52 (FIGS. 10 and 12-14) which is hinged at 54 on one end and carries a bumper 56 on the opposite end. The position of the lever 52 is controlled by the position of a housing 58 (See also FIGS. 1, 16 and 17) that carries the cutter mechanism 8, to be described later.

Figure 9:
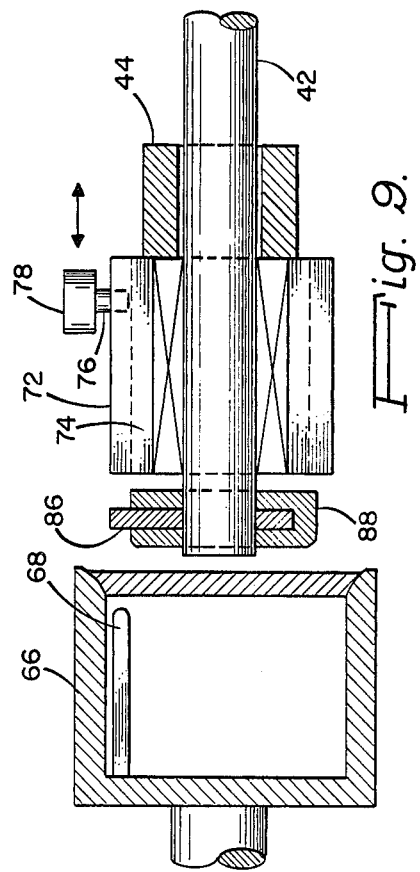
FIG. 9 is an enlarged diagrammatic sectional view of the drive coupling arrangement for illustrating its operation.
Figure 10:
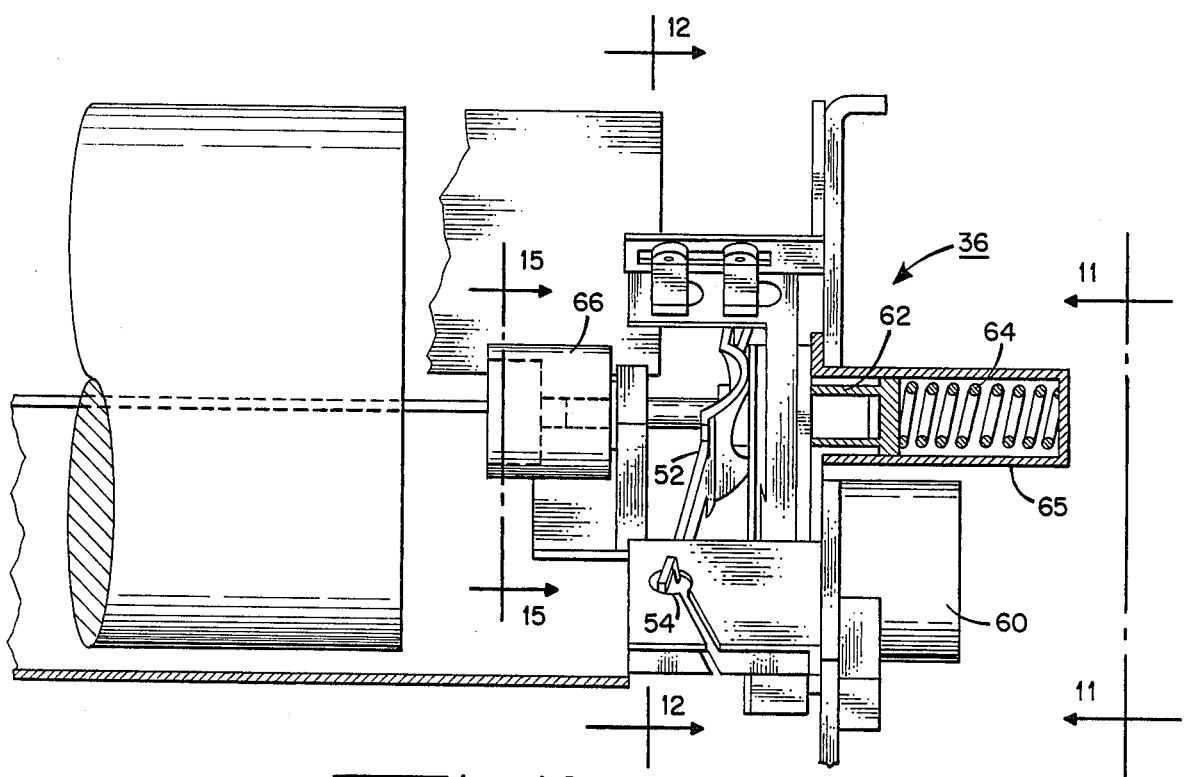
FIG. 10 is a partial sectional view showing the driving and control arrangement for the paper handling mechanism as viewed from the rear of the printer.
Figure 11:
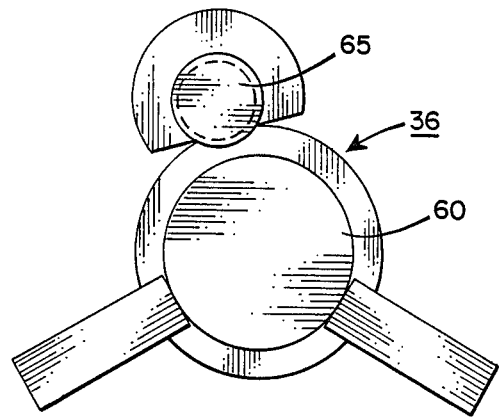
FIG. 11 is an end view along line 11—11 of FIG. 10.
Figure 15:
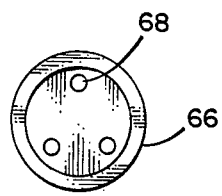
FIG. 15 is a partial view along line 15—15 of FIG. 10.
Figure 19:
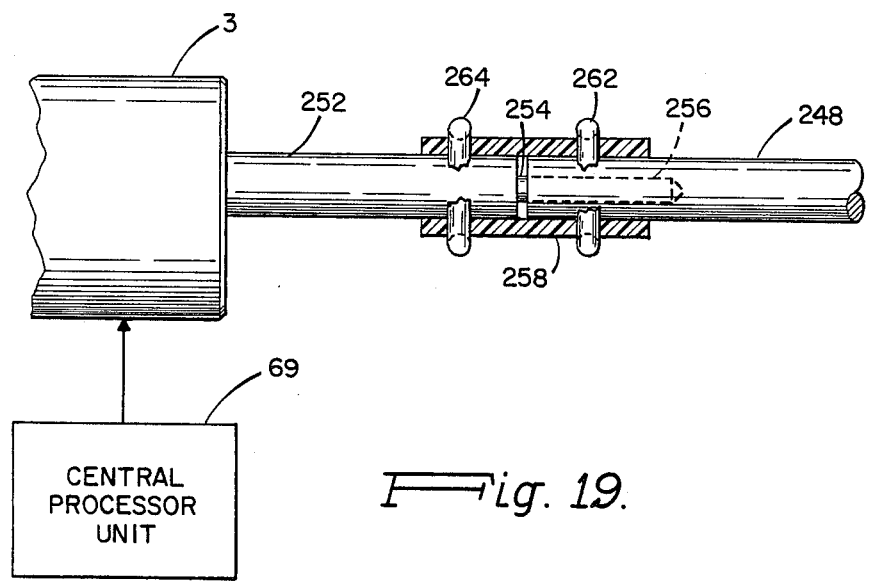
FIG. 19 is a view of the drive connection to the imaging drum.

When the printer is in the imaging mode and the drum 2 is rotating, the lever 52 retains a motor 60 and its associated assembly in its rest position, far right as viewed in FIG. 10. In this rest position, a plunger 62, controlled by the lever 52, maintains a spring 64 under maximum compression within a stationary mounting case 65. A drive sleeve 66 connected to the motor 60, and which contains three splines 68 (FIGS. 9 and 15) positioned circumferentially 120° apart within the sleeve 66, is spaced from the drum 2 leaving it free for rotation. The drum 2 is driven by the direct drive stepping motor 3, as illustrated by FIG. 19, which by means of a central processor control unit 69 stops the drum 2 at the end of the imaging cycle. The drum is then caused to rotate slowly until a radial mark 71, carried by a disk 70, (FIG. 5) which rotates with the drum 2, indicates through an infrared detector 73 that the drum 2 is in the correct position for coupling the drive 36 to the roller 12.

When the imaging operation is completed and the drum 2 has been stopped in its drive position, the housing 58 is moved to the drive position that causes the drive motor assembly 36 to be coupled to the roller 12 through the sleeve 66 to eject the imaged paper 6. In this position, the splines 68 engage the teeth of a spur gear 72 (FIGS. 5 and 9) that extends within the sleeve 66. The spur gear 44 is secured to gear 72 but is not secured to the shaft 42 other than through the gear 72. As best shown in FIG. 9, a collar 88, that forms the end of the mechanism by which rollers 12 and 14 are driven, and the interior of the sleeve 66 are tapered so that the drive sleeve 66 is brought into engagement with the gear 72 in spite of slight variations in the rotary position of the drum 2. The gear 72 is secured to the shaft 42 that carries the roller 12 through a conventional one-way clutch, diagrammatically illustrated at 74, that permits rotation of the shaft 42 in the direction of the arrow 32 of FIG. 4 relative to the gear 72 but prevents relative rotation in the opposite direction.

Figure 6:
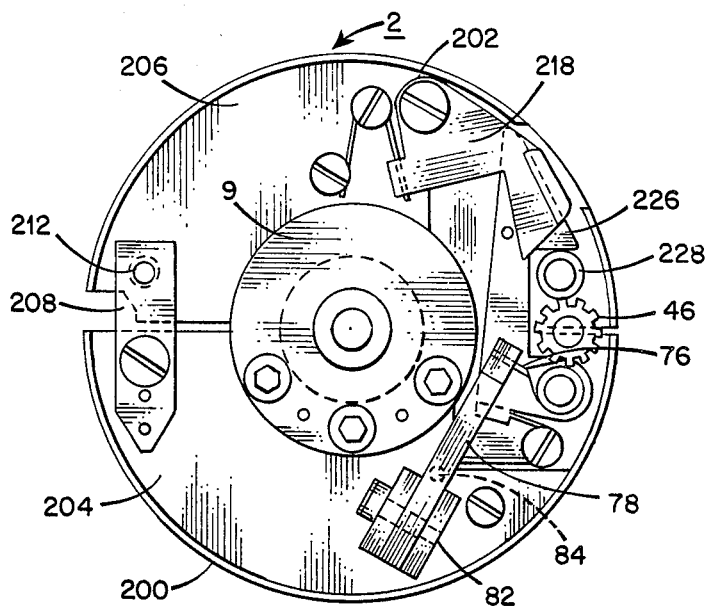
FIG. 6 is an end view of the imaging drum.
Figure 7:
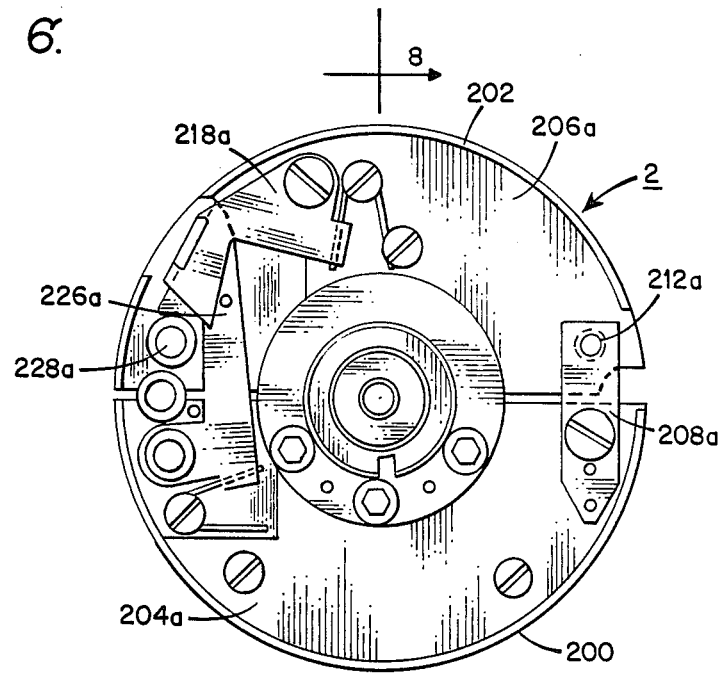
FIG. 7 is a view of the opposite end of the drum.
Figure 8:
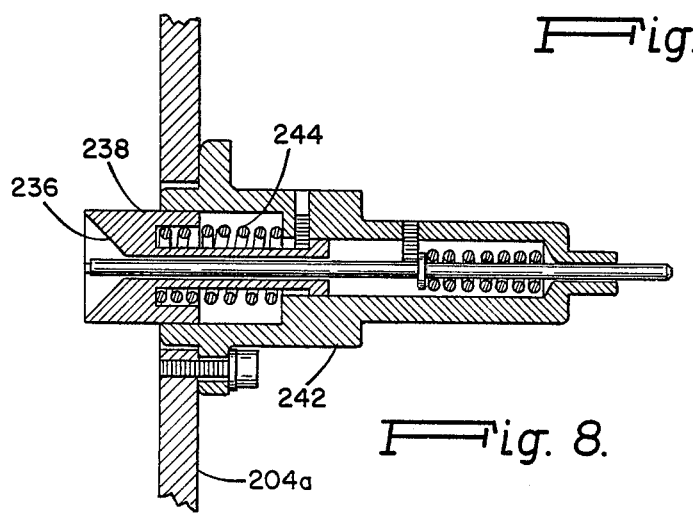
FIG. 8 is a partial sectional view along line 8—8 of FIG. 7.

The gear 72 is normally locked from rotation by a pin 76 (FIGS. 6 and 9) carried in the end of an arm 78 and which extends into the space between adjacent teeth on the gear 72. The arm 78 is hinged at 82 and is biased toward the locking position by a coil spring 84 positioned between the end of the drum 2 and the arm 78. In the position when the gear 72 is engaged by the drive sleeve 66, the end of the sleeve 66 abuts the arm 78 and moves it toward the right, as viewed in FIG. 9, so that the pin 76 no longer engages the gear 72.

When the paper has been ejected to the desired length, as determined by the counter disk 25 on the idler roller 10, the drive motor 60 is stopped which prevents movement of the rollers 12 and 14 while the paper is sheared by the cutter mechanism 8.

After the paper has been sheared, the motor assembly 36, while in the drive position, is driven in the reverse direction, by reversing the motor 60, to withdraw the paper, under the control of the counter disk 25, until only the short stub 18 projects from between the rollers 12 and 14. The housing 58 is then moved, against the force of the spring 64 (FIG. 10), to move the lever 52 and the motor assembly 36 to its intermediate or tensioning position. In this position, the end of the sleeve 66, which abuts the lever 78, has moved away from the drum 2 allowing the pin 76 (FIGS. 6 and 9), to lock the roller 14 by engaging the teeth of the gear 72, while the roller 12 is driven in the direction of the arrow 32 (FIG. 4). This is accomplished by a drive pin 86 (FIGS. 5 and 9) that extends through a collar 88 in the end of the shaft 42 of the roller 12. One of the splines 68 in the drive sleeve 66 engages the drive pin 86, but not the teeth of gear 72, while the gear 72, and thereby the gears 44 and 46 and the roller 14, are locked by the locking pin 76. In this state, while the gear 72 is locked, shaft 42 is free to rotate in the direction of arrow 32 of FIG. 4 because of the one-way clutch 74.

The Paper Shear Mechanism

The paper shear mechanism 8 is shown in more detail in FIGS. 16 and 17. It is driven horizontally by a screw 102 that engages a plastic drive nut 104 secured within the cutter housing 58. A shaft 108 extends between opposite sides of the housing 58 and carries a plastic support washer 112, a cutter wheel 114 and a resilient drive wheel 116 that is secured to the cutter wheel 114. The drive wheel 116 is maintained under pressure against the top surface of the cutter bar 7. The cutter wheel 114 is maintained in pressure engagement with a side edge of the cutter bar 7 by a coil spring 118. As the shear mechanism 8 is moved longitudinally by rotation of the screw 102, the drive wheel 116 causes the cutter wheel 114 to rotate and shear the paper 6.

To maintain the paper in firm contact with the cutter bar 7 and prevent wrinkling, a length of a constant force spring 120 is arranged to overlay the paper during the shearing operation. One end of the spring is secured to the upper surface of the cutter bar 7, as by a screw 124 (FIG. 16), and the other end portion forms a coil 122 that is rotatably mounted on a support 126 carried by the housing 58. As the cutter assembly 8 is moved in the direction of the arrow 128 to shear the paper, the spring 120 uncoils to lay on the surface of the paper. The spring is pressed against the paper by the force of the drive wheel 116 so that the paper is prevented from moving laterally ahead of the cutter assembly. When the shear is completed and the cutter assembly returns to its home position, the flat spring 120 returns to the coil 122.

The Imaging Drum

Access to the interior of the drum 2 may be by any appropriate means, such as by removing one end of the drum. In this preferred embodiment, access is provided by forming the drum of two hinged sections. The drum 2 (FIGS. 5-8) is formed of a cylindrical shell of two halves: a lower section 200 and a cover section 202. The lower section 200 of the drum 2 is provided at its ends with semicircular end plates 204 and 204a and the cover section 202 is provided with similar end plates 206 and 206a. The end plate 206 is hinged to the end plate 204 by an arm 208 secured to the plate 204 which carries a hinge pin 212. At the opposite end, the cover section is secured to the lower section by a similar arrangement of arm 208a and hinge pin 212a. The two sections are separated by a longitudinal slot by the distance necessary to permit the hinge action.

The idler roller 10 comprises a shaft 214 covered by a rubber sleeve and is mounted for free rotation in the end plates 206 and 206a of the cover section 202. The covering on shaft 214 may be any resilient material having a relatively high coefficient of friction to insure that the roller 10 will be rotated by any movement of the paper between the roller 10 and the drive roller 14. The rubber covering extends substantially the full length of the shaft 214 and is of uniform diameter.

The shaft 48 of the drive roller 14 is rotatably supported by two arms 218 and 218a which are hinged respectively to the end plates 206 and 206a of the cover drum section 202. Only the center portion of the shaft 48 is covered with a resilient sleeve 220, for example about two inches in length, that engages the rollers 10 and 12 when the cover section 202 is in its closed position.

The shaft 42 of the tensioning roller 12 is mounted in the end plates 204 and 204a of the lower drum section 200. This roller is similar in construction to the idler roller 10 and carries a resilient sleeve that extends most of the distance between the end plates 204 and 204a.

The drum is maintained in its closed position by a pair of latches 226 and 226a which are hinged respectively to end plates 204 and 204a of the lower drum section 200. The end plates 206 and 206a of the cover section respectively carry locking pins 228 and 228a that are engaged by the latches 226 and 226a. The latches are arranged with the hook portions facing radially outwardly of the drum 2 so that when the drum is rotating, during the imaging operation, the latches are pressed by centrifugal force into engagement with the pins 228 and 228a, thus providing protection against accidental release of the cover section from the lower drum section 200.

Figure 18:
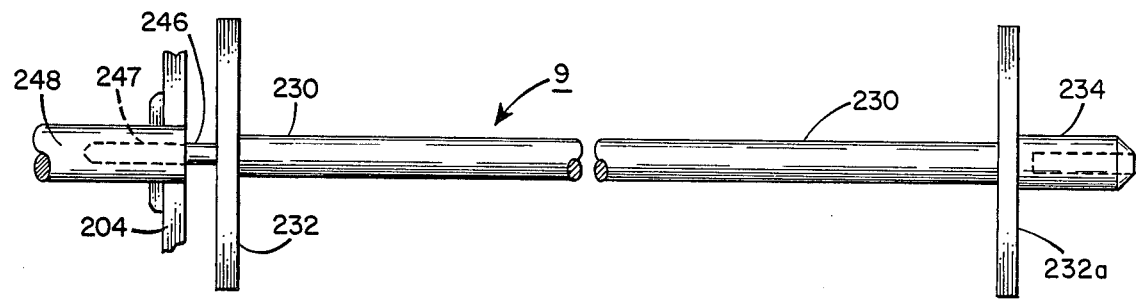
FIG. 18 is a front view of the spool that supports the paper within the drum.

When the latches 226 and 226a are manually released, the cover drum section 202 can be rotated about the hinge pins 212 and 212a to open the drum and permit access to the interior. The paper supply spool 9 (FIG. 18) is formed of a central support rod 230 extending between a pair of end flanges 232 and 232a that act as guides for the edges of the paper 6. One end of the spool 9 is provided with a conical projection 234 that fits into a conical recess 236 (FIG. 8) in a support plug 238. The plug 238 is slidably retained in a sleeve 242 that is retained by the end plate 204a that forms part of the lower section 200 of the drum 2. The plug 238 is spring loaded by a coil spring 244 that forces the plug toward the interior of the drum 2. When the spool 9 containing the paper 6 is placed in the drum, the conical projection 234 is positioned in the plug 238 and moved to compress the spring 244. This permits a shaft extension 246, on the opposite end of the spool, to be aligned with a bore 247 in the end of a support rod 248 (FIG. 18), mounted on the end plate 204, so that when the spool 9 is released, the support rod enters the bore 247 to maintain the spool 9 in position in the drum 2.

A drive shaft 252 (FIG. 19) from the motor 3 carries a projecting guide member 254 that extends into a bore 256 in the end of the suport rod 248. The mating arrangement of the support rod 248 and the projecting guide member 254 serves alignment purposes only and the guide 254 is free to rotate within the bore 256. The driving force is transmitted by a length of heavy flexible plastic sleeve 258 that is secured by clamps 262 and 264 respectively to the spool extension 246 and the motor drive shaft 252. With this arrangement, irregular drive movements of the stepping motor are damped to provide a uniform velocity of the drum 2.

The Operating System

Figure 23:
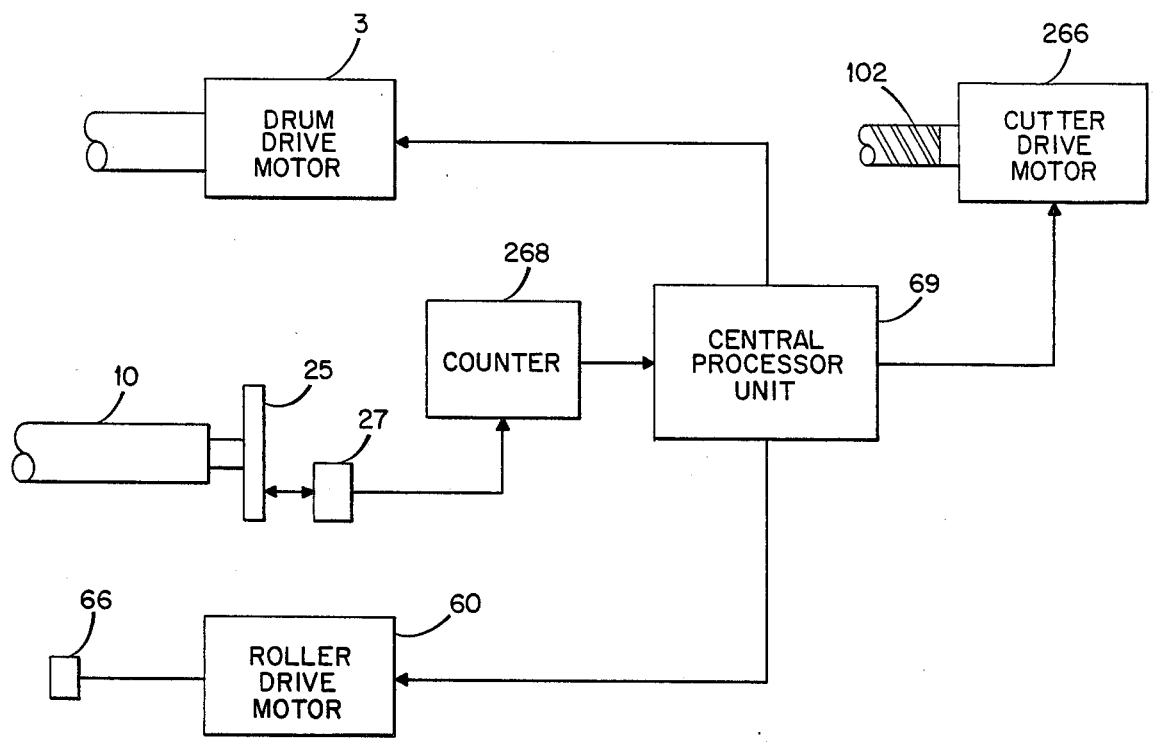
FIG. 23 is a block diagram illustrating the operation of the central processor unit.

All functions of the printer, including the operation of the head 4, the ejection, withdrawal and tensioning of the paper, and the operation of the cutter mechanism for both shearing and paper control, are controlled by a central processor, diagrammatically illustrated at 69 in FIGS. 19 and 23, using techniques well known in the art to perform the sequential functions.

Figure 20:
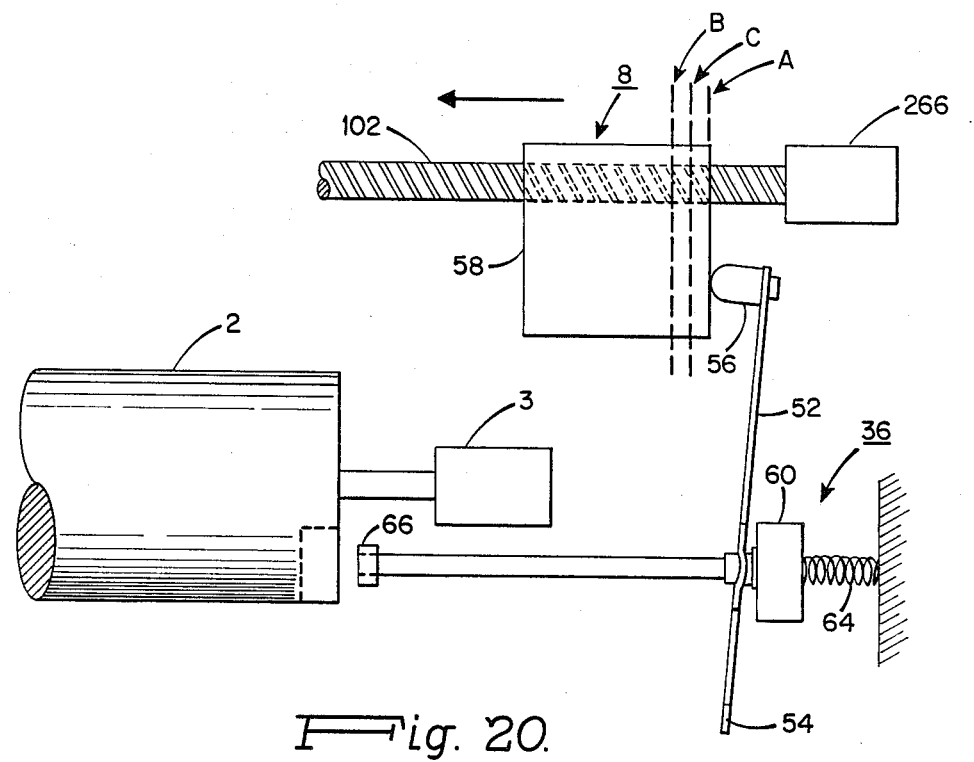
FIGS. 20, 21 and 22 are diagrammatic views for explaining the operating steps of the system.

FIGS. 20-23 illustrate diagrammatically the operational controls. FIG. 20 represents the condition when fresh paper has been positioned on the drum 2 and another image is to be created. The housing 58, driven by a motor 266, has forced the bumper 52 to its far right position "A", as viewed in FIG. 20, against the force of the spring 64. In this position, the tip of the bumper 56 lies in the plane indicated by the broken line A and the drive sleeve 66 is disconnected and spaced from the drum 2.

Figure 21:
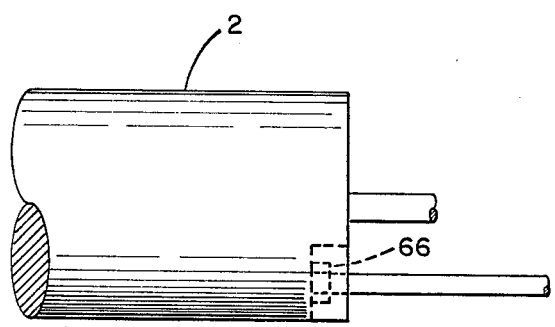
Figure 22:
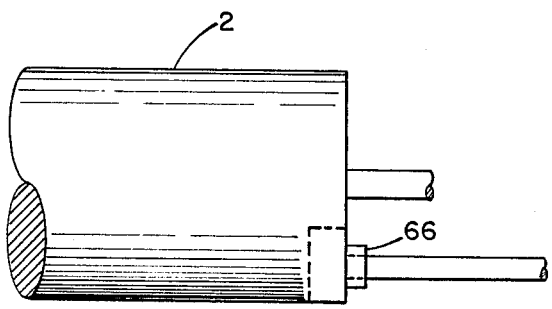

The drive motor 3 is then energized by a central processor unit 69 to cause the drum to rotate. At the same time, the mechanism (not shown) for moving the head and controlling the ink jets in accordance with the desired program, which may be of conventional construction, are also activated by the central processor unit 69. The drum continues to rotate until the printing head has completed the image, which is determined in accordance with the particular imaging program. The central processor unit 69 then stops the rotation of the drum 2, positions it for coupling to the roller drive assembly 36 and then activates the motor 266 to drive the screw 102 and cause the housing 58 to move to position "B" in which the tip of the bumper 56 lies in the plane indicated by the broken line B in FIG. 20. In this position, the drive sleeve 66 is fully engaged with the drum 2, as indicated in FIG. 21, and both rollers 12 and 14 are driven by the motor 60 in the directions of the arrows 22 and 24 in FIG. 3. The imaged paper is then ejected from the drum 2 while the surface of the drum 2 is replenished with fresh paper. When a predetermined length of paper has been ejected, as measured by a counter 268 (FIG. 23) connected to the infrared detector 27 which measures the rotation of the disk 25 and idler roller 10, the processor unit 69 deenergizes the roller drive motor 60 and energizes the cutter drive motor 266 to shear the imaged paper. The motor 266 is then reversed returning the housing 58 to position "B", placing the tip of the bumper 56 again in the plane indicated at B. The motor 60 is then energized in the reverse direction to withdraw the length of paper between the drum 2 and the cutter bar 7 into the drum. The amount withdrawn is again measured by the rotation of the idler roller 10 through the counter 268 which stops the motor 60 when only the stub 18 is left protruding from between the rollers 12 and 14.

The central processor unit 69 then again activates the motor 266 to move the housing to its "C" position in which the tip of the bumper lies in the plane indicated by the broken line C in FIG. 20. In this intermediate position, indicated by FIG. 22, the roller 14 is locked from rotation, as previously described, and the roller 12 is driven by motor 60 in the direction of the arrow 32 to tension the paper around the drum 2. The motor 60 is energized for approximately 5 seconds or for a time period sufficient to insure tensioning of the paper.

When the paper has been tensioned around the drum, the printer is ready for the next imaging operation. The processor unit 69 then moves the housing 58 to its "A" position and the entire process is repeated.

We claim:

1. In an image forming device, apparatus comprising
a drum,
first drive means for rotating said drum,
sheet material positioned within said drum and extending from the interior of said drum around the outside surface,
image forming means arranged to produce an image on said sheet material while said drum is rotating,
positioning means arranged to stop said drum in a predetermined position,
sheet material drive means carried by said drum comprising first and second rollers and engaging said sheet material between said rollers both prior to and after its engagement with the outer surface of said drum,
second drive means, and
means coupling said second drive means to said sheet material drive means when said drum is in said predetermined position thereby to cause said sheet material to be withdrawn from said drum and follow a path around the exterior of said drum and thence away from said drum.

2. Apparatus as claimed in claim 1 including
a spool rotatably mounted within and on the longitudinal axis of said drum and supporting said sheet material.

3. Apparatus as claimed in claim 1 including
a cutter mechanism, and
means for moving said cutter mechanism along a path transverse to said sheet material thereby to shear said sheet material.

4. Apparatus as claimed in claim 1 wherein
said means coupling said second drive means to said sheet material drive means has first, second and third spatial positions, and including
paper ejection means responsive to said first position arranged to drive said first roller in a first direction thereby to eject said sheet material from said drum,
paper retraction means responsive to said second position arranged to drive said first roller in a second direction thereby to withdraw said sheet material toward said drum, and
means responsive to a third position arranged to disengage said second drive means from said drum thereby to permit rotation of said drum by said first drive means.

5. In an image-forming system, the combination comprising
a cylindrical drum,
means supporting said drum for rotation about its longitudinal axis,
drive means arranged to rotate said drum,
imaging means arranged to produce an image on sheet material while said drum is rotating,
drum positioning means responsive to the completion of said image arranged to interrupt the rotation of said drum and stop it in a predetermined rotary position,
a supply spool having a roll of sheet material thereon,
means rotatably supporting said spool within said drum,
first and second rollers extending longitudinally of said drum,
said sheet material extending from said spool between said first and second rollers, around the outer surface of said drum, and thence again between said first and second rollers,
means responsive to completion of said image arranged to interrupt the rotation of said drum and stop it in a predetermined position,
a drive motor,
drive coupling means arranged to releasably couple said drive motor to said drum when said drum is in said predetermined position, said drive coupling means having first, second and third positions,
ejection means responsive to said first position of said drive coupling means for driving said first roller in a first direction thereby to eject said sheet material from said drum,
means for shearing said sheet material,
retraction means responsive to said second position of said drive coupling means arranged to drive said first roller in a second direction thereby to withdraw the sheared end of said paper toward said drum, and
means responsive to the third position of said drive coupling means arranged to disengage said drive motor from said drum to permit rotation of said drum by said drive means.

6. The method of handling sheet material in a drum-imaging process comprising the steps of
providing a cylindrical drum having a longitudinal opening therein,
positioning within said drum a supply of said sheet material,
extending said sheet material through said opening, between a pair of rollers carried by said drum, around the outer surface of said drum, and thence again between said rollers,
rotating said drum,
producing an image on said sheet material on the surface of said drum while said drum is rotating,
stopping said drum in a predetermined position,
connecting sheet material drive means to said drum and transporting said sheet material along a path from the interior of said drum, around the outer surface of said drum and thence away from said drum,
shearing said sheet material along a transverse path at a predetermined distance from said drum, and
reversing the direction of said drive means and thereby withdrawing the sheared end of said material toward said drum.

* * * * *